United States Patent
Mulaosmanovic et al.

(10) Patent No.: US 11,800,482 B2
(45) Date of Patent: *Oct. 24, 2023

(54) MOBILE TRANSCEIVER HAVING ROUTE MONITORING AND METHOD OF OPERATION

(71) Applicant: BlackBerry Limited, Waterloo (CA)

(72) Inventors: Jasmin Mulaosmanovic, Kitchener (CA); Robert Joseph Lombardi, Hamilton (CA); Brian Thomas Wells, Kitchener (CA); Sergio Javier Berriz, Miami, FL (US)

(73) Assignee: BlackBerry Limited, Waterloo (CA)

( * ) Notice: Subject to any disclaimer, the term of this patent is extended or adjusted under 35 U.S.C. 154(b) by 2 days.

This patent is subject to a terminal disclaimer.

(21) Appl. No.: 17/551,291

(22) Filed: Dec. 15, 2021

(65) Prior Publication Data
US 2022/0217672 A1 Jul. 7, 2022

Related U.S. Application Data

(63) Continuation of application No. 16/207,312, filed on Dec. 3, 2018, now Pat. No. 11,234,205, which is a
(Continued)

(51) Int. Cl.
| | | |
|---|---|---|
| *H04W 64/00* | (2009.01) | |
| *G01S 19/13* | (2010.01) | |
| *G01S 11/02* | (2010.01) | |
| *G01S 5/02* | (2010.01) | |
| *G06Q 10/0833* | (2023.01) | |

(Continued)

(52) U.S. Cl.
CPC ........ *H04W 64/00* (2013.01); *G01C 21/3415* (2013.01); *G01S 5/0027* (2013.01); *G01S 5/0294* (2013.01); *G01S 5/02521* (2020.05);
*G01S 11/02* (2013.01); *G01S 19/13* (2013.01); *G06Q 10/0833* (2013.01);
(Continued)

(58) Field of Classification Search
CPC .... H04W 4/02; H04W 64/00; G06Q 10/0833; G06F 17/00; G06F 21/88; G01S 5/14; G01S 19/13; G01S 5/0294; G01S 11/02
See application file for complete search history.

(56) References Cited

U.S. PATENT DOCUMENTS

| | | |
|---|---|---|
| 5,751,245 A | 5/1998 | Janky et al. |
| 6,711,404 B1 | 3/2004 | Arpee |
(Continued)

FOREIGN PATENT DOCUMENTS

| | | |
|---|---|---|
| EP | 2011354 | 1/2009 |
| EP | 2640136 | 3/2014 |

OTHER PUBLICATIONS

Notification of Transmittal of the International Search Report and Written Opinion; PCT/US2017/045332; dated Jan. 29, 2018.
(Continued)

*Primary Examiner* — Margaret G Mastrodonato
(74) *Attorney, Agent, or Firm* — Ridout & Maybee LLP

(57) ABSTRACT

A mobile transceiver for asset tracking having route monitoring and method of operation are provided. In one aspect, the method comprises: determining a location of the mobile transceiver using the satellite receiver; determining whether the determined location deviates from a planned route; and sending an alert to an asset tracking service when the determined location deviates from the planned route.

20 Claims, 4 Drawing Sheets

Related U.S. Application Data continuation of application No. 15/231,017, filed on Aug. 8, 2016, now Pat. No. 10,149,269.

(51) Int. Cl.

| | | |
|---|---|---|
| *G01C 21/34* | (2006.01) | |
| *G01S 5/00* | (2006.01) | |
| *H04W 4/029* | (2018.01) | |
| *G08G 1/0968* | (2006.01) | |
| *G08G 1/00* | (2006.01) | |

(52) U.S. Cl.
CPC .. *G08G 1/096816* (2013.01); *G08G 1/096838* (2013.01); *G08G 1/205* (2013.01); *H04W 4/029* (2018.02)

(56) References Cited

U.S. PATENT DOCUMENTS

| | | |
|---|---|---|
| 7,212,829 B1 | 5/2007 | Lau |
| 7,356,561 B2 | 4/2008 | Balachandran |
| 7,509,125 B2 | 3/2009 | Vuong |
| 7,593,711 B2 | 9/2009 | Romano |
| 7,847,726 B2 | 12/2010 | Jia |
| 7,853,218 B2 | 12/2010 | Romano |
| 8,401,548 B2 | 3/2013 | Vuong |
| 8,494,566 B2 | 7/2013 | Chen |
| 2007/0239322 A1 | 10/2007 | McQuade |
| 2012/0057476 A1 | 3/2012 | Chan |
| 2013/0069803 A1 | 3/2013 | McCormick |
| 2013/0238915 A1 | 9/2013 | Kashikar |
| 2014/0278044 A1 | 9/2014 | Jacobs et al. |
| 2015/0106011 A1 | 4/2015 | Nesbitt |
| 2016/0155310 A1 | 6/2016 | Joao |

OTHER PUBLICATIONS

Non-Final Office Action; U.S. Appl. No. 15/231,017; dated Jan. 24, 2018.
Invitation to pay additional fees and where applicable, protest fees; PCT/US2017/045332 dated Nov. 9, 2017.
Final Office Action; U.S. Appl. No. 15/231,017; dated Jul. 9, 2017.
Aaron Schulman, Vishnu Navda, Ramachandran Ramjee, Neil Spring, Pralhad Deshpande, Calvin Grunewald, Kamal Jain, and Venkata N. Padmanabhan, Bartendr: A Practical Approach to Energy-aware Cellular Data Scheduling, MobiCom '10 Proceedings of the sixteenth annual international conference on Mobile computing and networking, pp. 85-96, Sep. 20-24, 2010, Chicago, Illinois, USA.
Abtin Keshavarzian, Huang Lee and Lakshmi Venkatraman, Wakeup Scheduling in Wireless Sensor Networks, MobiHoc '06 Proceedings of the 7th ACM international symposium on Mobile ad hoc networking and computing, pp. 322-333, May 22-25, 2006, Florence, Italy.
Unknown Author, Signal Tracker—Cell Phone Signals on the map, BlackBerry World, Application Profile, https://appworld.blackberry.com/webstore/content/34952895/?countrycode=CA&lang=en, at least as early as Oct. 10, 2015.
Unknown Author, Monitoring a GPS Tracker with our Alerts System, http://www.usfleettracking.com/blog/2014/04/23/monitoring-gps-tracker-alerts-system/, Apr. 2014.
Unknown Author, About OpenSignal, https://opensignal.com/about/, at least as early as Oct. 10, 2015.
Unknown Author, No title, page lists smartphone apps that allow the contribution of GSM cell tower measurements to the OpenCellID database, http://wiki.opencellid.org/wiki/Data_sources, as early as Jul. 2, 2015.
Unknown Author, Signal CS, GPS Tracking System, http://www.signalcs.com/pages.php?page_id=8, 2013.
Unknown Author, Railcar GPS Tracking & Monitoring, Lat-Lon, at least as early as Oct. 10, 2015.
Non-Final Office Action; U.S. Appl. No. 15/231,017; dated Feb. 27, 2017.
International Preliminary Report on Patentability; PCT PCT/US2017/045332; dated Feb. 21, 2019.
Office Action; U.S. Appl. No. 16/207,312; dated Nov. 18, 2019.
Final Rejection; U.S. Appl. No. 16/207,312; dated May 28, 2020.
Advisory Action; U.S. Appl. No. 16/207,312; dated Aug. 19, 2020.
Office Action; U.S. Appl. No. 16/207,312; dated Mar. 17, 2021.
Notice of Allowance; U.S. Appl. No. 16/207,312; dated Sep. 28, 2021.

MOBILE TRANSCEIVER HAVING ROUTE MONITORING AND METHOD OF OPERATION

RELATED APPLICATION DATA

The present application is a continuation of non-provisional U.S. patent application Ser. No. 16/207,312, filed Dec. 3, 2018, which is a continuation of non-provisional U.S. patent application Ser. No. 15/231,017, filed Aug. 8, 2016, the content of these documents being incorporated herein by reference.

TECHNICAL FIELD

The present disclosure relates generally to mobile transceivers, and more specifically, to a mobile transceiver for asset tracking having route monitoring and method of operation.

BACKGROUND

Global Navigation Satellite System (GNSS) tracking devices, such as Global positioning system (GPS) tracking devices, are devices carried by objects or persons ("carriers") which measure the location of the carrier using the GNSS at regular intervals and typically store the location in internal memory. There are three main types of GNSS tracking devices: a data logger, a data pusher and a data puller. A data logger stores the measured location data in internal memory for subsequent download and analysis. A data pusher (also known as a beacon) sends location data stored in internal memory to a server or other device in accordance with predefined parameters. A data puller (also known as a transponder) stores location data in internal memory and provides the location data in response to queries from a server or other device.

GNSS tracking devices typically have limited power and/or limited processing resources. Accordingly, methods of efficiently operating and deploying GNSS tracking devices are desirable.

DESCRIPTION OF EXAMPLE EMBODIMENTS

Figure 1:
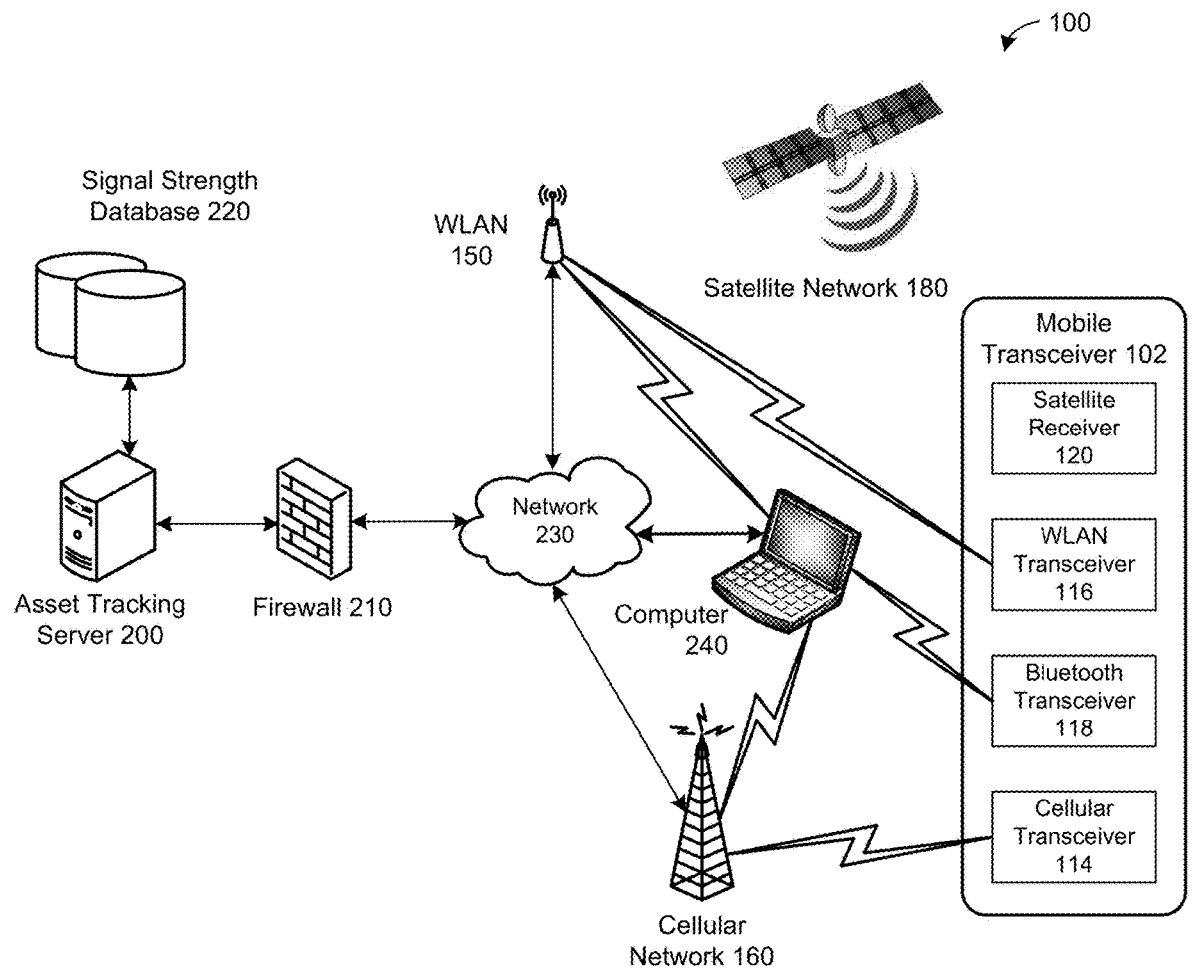
FIG. 1 is a block diagram illustrating a communication system suitable for operating a mobile transceiver in accordance with the present disclosure.

The present disclosure is made with reference to the accompanying drawings, in which embodiments are shown. However, many different embodiments may be used, and thus the description should not be construed as limited to the embodiments set forth herein. Rather, these embodiments are provided so that this disclosure will be thorough and complete. Like numbers refer to like elements throughout, and prime notation is used to indicate similar elements, operations or steps in alternative embodiments. Separate boxes or illustrated separation of functional elements of illustrated systems and devices does not necessarily require physical separation of such functions, as communication between such elements can occur by way of messaging, function calls, shared memory space, and so on, without any such physical separation. As such, functions need not be implemented in physically or logically separated platforms, although illustrated separately for ease of explanation herein. Different devices can have different designs, such that while some devices implement some functions in fixed function hardware, other devices can implement such functions in a programmable processor with code obtained from a machine readable medium.

The present disclosure provides a mobile transceiver that allows global and long-range tracking applications in which an asset in global and long-range transit can be tracked even though it crosses wireless carrier and network coverage boundaries while in transit. In global and long-range tracking applications the mobile transceiver and the asset being tracked will cross wireless carrier and network coverage boundaries while in transit. For example, it is not uncommon for a shipping container to originate in mainland China and travel around South Africa with a final destination in North America. The mobile transceiver of the present disclosure includes one or more wireless transceivers which allow the mobile transceiver to communicate using one of a number of wireless services, such as 4G LTE, 3G, 2G, WLAN/Wi-Fi and/or Bluetooth, etc. to account for the various wireless services that may be available at any time while in transit.

When the mobile transceiver wakes up after a period of inactivity, the cellular service that was last used may no longer be available. Additionally, if crossing continental boundaries and international borders, the wireless access technology and RF bands may not overlap. The present disclosure provides methods of operating the mobile transceiver (e.g., tracking device) for global and long-range tracking that is power efficient and that extends the expected life of the battery of the mobile transceiver. This is particularly advantageous when the mobile transceiver is provided with a non-rechargeable battery or when a rechargeable battery is provided but the mobile transceiver is used in environments when an external power source to recharge the battery is unavailable.

In accordance with an example embodiment of one aspect of the present disclosure, there is provided a method of operating a mobile transceiver, the method comprising: determining a location of the mobile transceiver using the satellite receiver; determining whether the determined location deviates from a planned route; and sending an alert to an asset tracking service when the determined location deviates from the planned route.

In accordance with another example embodiment of one aspect of the present disclosure, there is provided a method of operating a mobile transceiver, the mobile transceiver comprising a processor, and a memory, satellite receiver and cellular transceiver each coupled to the processor, the method comprising: determining a location of the mobile transceiver using the satellite receiver; calculating a speed of travel using location data obtained from the satellite receiver or an asset tracking log; identifying one or more waypoints in a travel itinerary at which cellular service is likely to be available at the determined location based on a signal strength database; determining one or more estimated time of arrivals (ETAs) at the identified one or more waypoints based on the calculated speed; setting one or more alarms to be triggered at the one or more ETAs.

In accordance with a further example embodiment of one aspect of the present disclosure, there is provided a method of monitoring a route of a mobile transceiver, comprising: determining by the mobile transceiver a location of the mobile transceiver using a satellite receiver; determining by the mobile transceiver whether the determined location deviates from a planned route; in response to a determination that the determined location deviates from a planned route, determining a priority of the deviation from the planned route; and in response to a determination that deviation from the planned route is a high priority deviation, activating a cellular transceiver of the mobile transceiver from a low power mode, and sending an alert from the mobile transceiver to an asset tracking service via the cellular transceiver.

In accordance with yet a further example embodiment of one aspect of the present disclosure, there is provided a method of monitoring a route of a mobile transceiver, comprising: determining by the mobile transceiver a location of the mobile transceiver using a satellite receiver; determining whether the determined location is within a threshold distance of a waypoint of a travel itinerary defining a planned route, the travel itinerary comprising a plurality of waypoints including an origin, a destination, and a plurality of intermediate waypoints between the origin and the destination, the travel itinerary specifying a Global Navigation Satellite System (GNSS) coordinate for each of the waypoints in the travel itinerary; and sending an alert from the mobile transceiver to an asset tracking service in response to a determination that the determined location is more than the threshold distance from a waypoint of the travel itinerary.

In accordance with yet a further example embodiment of one aspect of the present disclosure, there is provided a method of monitoring a route of a mobile transceiver, comprising: determining by the mobile transceiver a location of the mobile transceiver using a satellite receiver; determining whether the determined location is within a threshold distance of a waypoint of a travel itinerary defining a planned route, the travel itinerary comprising a plurality of waypoints including an origin, a destination, and a plurality of intermediate waypoints between the origin and the destination, the travel itinerary specifying a Global Navigation Satellite System (GNSS) coordinate for each of the waypoints in the travel itinerary; determining, based on the determined location and the travel itinerary, whether the mobile transceiver is progressing towards the destination defined by the travel itinerary; and sending an alert from the mobile transceiver to an asset tracking service in response to a determination that the mobile transceiver is not progressing towards the destination defined by the travel itinerary.

In accordance with an example embodiment of another aspect of the present disclosure, there is provided a mobile transceiver, comprising: a processor; a memory coupled to the processor; a satellite receiver coupled to the processor; and a cellular transceiver coupled to the processor; wherein the processor is configured to perform the methods described herein.

In accordance with an example embodiment of a further aspect of the present disclosure, there is provided a non-transitory machine readable medium having tangibly stored thereon executable instructions for execution by a processor of a mobile transceiver, the mobile transceiver comprising a memory, a satellite receiver, and a cellular transceiver each coupled to the processor, wherein the executable instructions, when executed by the processor, cause the mobile transceiver to perform the methods described herein.

Figure 2:
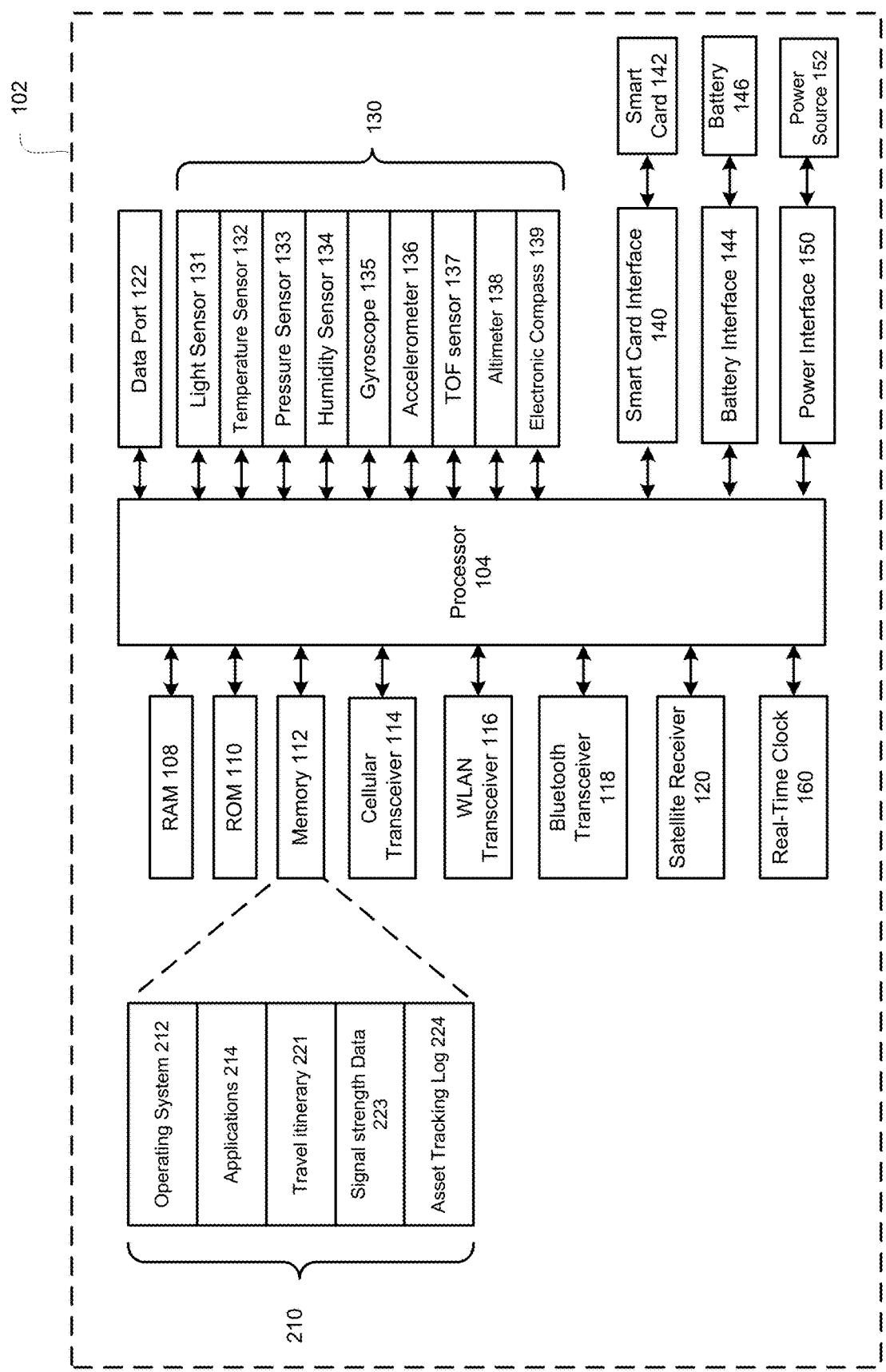
FIG. 2 is a block diagram illustrating a mobile transceiver in accordance with an example embodiment of the present disclosure.

Referring to FIGS. 1 and 2, an example embodiment of a mobile transceiver 102 of the present disclosure will be described. The mobile transceiver 102 comprises at least one processor 104 which controls the overall operation of the mobile transceiver 102. The processor 104 is coupled to a plurality of components via a communication bus (not shown) which provides a communication path between the components and the processor 104. The mobile transceiver 102 also comprises a Random Access Memory (RAM) 108, Read Only Memory (ROM) 110, a persistent (non-volatile) memory 112 which may be flash erasable programmable read only memory (EPROM) ("flash memory") or other suitable form of memory, a data port 122 such as a serial data port (e.g., Universal Serial Bus (USB) data port), a plurality of environmental sensors 130 for sensing the environment of the mobile transceiver 102, and a real-time clock (RTC) 160. The mobile transceiver typically also includes a power management integrated circuit (PMIC) for managing power requirements of the mobile transceiver 102.

The RTC 160 is a low power subsystem that runs even when the mobile transceiver 102 is in deep sleep mode. The RTC 160 typically comprises a crystal oscillator that provides accurate real-time information, such as those provided by Atmel Corporation.

The sensors 130 may comprise a light sensor 131, temperature sensor 132, pressure sensor 133, humidity sensor 134, gyroscope 135, accelerometer 136, one or more time-of-flight (ToF) sensors 137, altimeter 138, electronic compass 139 and possibly other sensors such as a door contact switch (not shown).

The mobile transceiver 102 also comprises a satellite receiver 120 for receiving satellite signals from a satellite network 180 that comprises a plurality of satellites which are part of a global or regional satellite navigation system. In some embodiments, a satellite transceiver capable of both receiving and sending satellite signals may be provided instead of a satellite receiver which can only receive satellite signals.

The mobile transceiver 102 can use signals received by the satellite receiver 120 from a plurality of satellites in the satellite network 180 to determine its position. In at least some embodiments, the satellite network 180 comprises a plurality of satellites which are part of at least one Global Navigation Satellite System (GNSS) that provides autonomous geo-spatial positioning with global coverage. For example, the satellite network 180 may be a constellation of GNSS satellites. Example GNSSs include the United States NAVSTAR Global Positioning System (GPS) or the Russian GLObal NAvigation Satellite System (GLONASS). Other satellite navigation systems which have been deployed or which are in development include the European Union's Galileo positioning system, China's BeiDou Navigation Satellite System (BDS), the Indian regional satellite navigation system, and the Japanese satellite navigation system.

The mobile transceiver 102 also comprises one or more wireless transceivers for exchanging at least data communication. The wireless transceivers comprises at least a cellular (RF) transceiver 114 for communicating with a plurality of different radio access networks (RAN) such as a cellular network 160 using different wireless data communication protocols and standards. The mobile transceiver 102 may communicate with any one of a plurality of fixed transceiver base stations (one of which is shown in FIG. 1) of the cellular network 160 within its geographic coverage area. The mobile transceiver 102 may send and receive signals over the cellular network 160 after the required network registration and/or activation procedures have been completed. In the described embodiment, the cellular transceiver 114 is a multi-band transceiver that supports multiple radio frequency bands which may include, for example, multiple 4G Long-Term Evolution (LTE) or LTE Advanced bands as well as global 3G and 2G bands such as, for example, a TOBY-L2 series wireless transceiver from u-blox Holding AG of Switzerland. In other embodiments, multiple dedicated transceivers may be provided to support different wireless services, such as 4G LTE, 3G and 2G wireless services.

Examples of technologies that can be used by the cellular transceiver 114 include LTE, LTE Advanced, General Packet Radio Service (GPRS), Mobitex™, and Data TAC™. Other example technologies that can be used by the cellular transceiver 114 include Advanced Mobile Phone System (AMPS), time division multiple access (TDMA), Code Division Multiple Access (CDMA), Wideband code division multiple access (W-CDMA), Personal Communication Service (PCS), GSM (Global System for Mobile Communication), Cellular Digital Packet Data (CDPD), integrated Digital Enhanced Network (iDEN), High-Speed Downlink Packet Access (HSPDA), Evolution-Data Optimized (EvDO), Enhanced Data rates for GSM Evolution (EDGE), etc. Other types of communication networks, both separate and integrated, may also be utilized with the mobile transceiver 102. The mobile transceiver 102 may also be compliant with other communication standards such as 3GSM, 3rd Generation Partnership Project (3GPP), Universal Mobile Telecommunication System (UMTS), 4G, etc. The above-noted technologies are used by example and are not exhaustive. The described embodiments do not depend on any particular characteristics or capabilities of the RAN.

The wireless transceivers may also comprise a wireless local area network (WLAN) transceiver 116 for communicating with a WLAN 150 via a WLAN access point (AP). The WLAN 150 may comprise a Wi-Fi wireless network which conforms to IEEE 802.11x standards (sometimes referred to as Wi-Fi®). Other communication protocols may be used for the WLAN 104 in other embodiments.

The wireless transceivers may also comprise a short-range wireless transceiver, such as a Bluetooth® transceiver 118, for communicating with a computing device 240, such as a personal computer or tablet. The mobile transceiver 102 may alternatively communicate with the computer 240 using a physical link such as the data port 122 (e.g., USB port). The Bluetooth transceiver 118 could be compatible with any suitable version of the Bluetooth protocol including Bluetooth low energy (Bluetooth Smart). Other short-range wireless communication technologies may be provided instead of, or in addition to, Bluetooth® including but not limited to Near field communication (NFC), IEEE 802.15.3a (also referred to as UltraWideband (UWB)), Z-Wave, Zig-Bee, ANT/ANT+ or infrared (e.g., Infrared Data Association (IrDA) communication).

Data received by the mobile transceiver 102 may be decompressed and decrypted by a decoder (not shown). The communication subsystem of the mobile transceiver 102 also includes one or more antennas, a processor such as a digital signal processor (DSP), and local oscillators (LOs). The specific design and implementation of the communication subsystem is dependent upon the wireless communication technologies implemented by the mobile transceiver 102.

Network access requirements vary depending upon the type of cellular network 160. In the described embodiment, the mobile transceiver 102 includes a smart card interface 140 for receiving a smart card 142 for storing and reading data by the processor 104. The smart card 142 may be a Subscriber Identity Module (SIM) card for use in a GSM network or other type of smart card for use in the relevant wireless network type which provides wireless network access. In at least some embodiments, the smart card 142 is a Universal Integrated Circuit Card (UICC) containing at least a SIM and a USIM application. UICC is the smart card used in most contemporary GSM and UMTS networks. While a SIM card for a GSM network has been described as an example, the term smart card is intended to encompass all types of smart cards and other similar technology for providing a Universal Subscriber Identity Module (USIM), Removable User Identity Module (R-UIM) or CDMA Subscriber Identity Module (CSIM) or other similar technology used in UMTS and CDMA networks.

The mobile transceiver 102 also includes a battery 146 as a power source. The battery 146 may be a rechargeable or non-rechargeable battery. The battery 146 provides electrical power to at least some of the components of the mobile transceiver 102. A battery interface 144 provides a mechanical and electrical connection for the battery 146. The battery interface 144 may be coupled to a regulator (not shown) which provides power V+ to the circuitry of the mobile transceiver 102. In some embodiments, the battery 146 is a large-capacity, non-rechargeable, sealed battery which is expected to have a relatively long service life, such as 5-7 years of active service.

The mobile transceiver 102 may also include a power interface, such as a power port, for connecting to an external power source 152 such as an alternating current (AC) power adapter or the computing device 240. The power interface may be a USB port or other port for connecting to the external power source via a cable. The mobile transceiver 102 can use the external power source 152 rather than the battery 146. If the battery 146 is rechargeable, the external power source 152 may be used to recharge the battery 146.

The memory 112 stores data 210, such as application data, and software modules comprising an operating system 212 and applications 214. The software modules or parts thereof may be temporarily loaded into volatile memory such as the RAM 108. The RAM 108 is used for storing runtime data and other data. The application data comprises a travel itinerary 221 and cellular signal strength data 223 collected by the mobile transceiver 102 when connecting or attempting to connect to a cellular RAN such as the cellular network 160.

Referring again to FIG. 1, an example communication system 100 in which a mobile transceiver 102 of the present disclosure can operate will be described. The mobile transceiver 102 typically uses the cellular network 160 to access an asset tracking service (e.g., an asset (or fleet) tracking server or asset management system) 200. The asset tracking service 200 may be implemented as one or more server modules and is typically located behind a firewall 210. The asset tracking service 200 may be connected to a signal strength database 220. The database 220 may be physically located either locally or remotely from the asset tracking service 200. In some embodiments, the database 220 may be a module of the asset tracking service 200. The asset tracking service 200 provides administrative control and management capabilities over a plurality of managed mobile transceivers 102.

The asset tracking service 200 provides secure transmission of data exchanged between the asset tracking service 200 and the plurality of managed mobile transceivers 102.

Communication between the asset tracking service 200 and the mobile transceivers 102 may be encrypted, for example, using Advanced Encryption Standard (AES) or Triple Data Encryption Standard (Triple DES) encryption.

The mobile transceiver 102 uses signals received by the satellite receiver 120 from a plurality of satellites in the satellite network 180 to determine its position. For example, the mobile transceiver 102 may use the satellite receiver 120 to determine is location at regular intervals, in accordance with a predefined schedule, or in response to a trigger event, among other possibilities. The frequency or schedule at which the location is determined may be fixed or configurable. The mobile transceiver 102 stores the determined location, typically in terms of latitude and longitude, in a data log stored in the memory 112 of the mobile transceiver 102. The values for latitude and longitude may be specified in one of a number of different formats including degrees minutes seconds (DMS), degrees decimal minutes (DDM), or decimal degrees (DD). A time at which the location was determined is typically also stored in the data log. The data log is sometimes known as an asset tracking log 224.

The mobile transceiver 102 may also use one or more of the sensors 130 to sense or measure an environment of the mobile transceiver 102. For example, the sensors 130 may be used to measure temperature, pressure and humidity, as well as door open or movement events, among other parameters. The sensor data obtained via the sensors 130 and a time at which the sensor data was obtained are also stored in the data log (i.e., the asset tracking log 224), which is stored in the memory 112. The time may be specified using UTC time (Coordinated Universal Time), for example, as defined by International Telecommunications Union Recommendation (ITU-R TF.460-6). Time may be specified in 24 hr time hh:mm:ss format and date may be specified in dd:mm:yyyy format. Alternatively, local time may be supported. As with the location data, the mobile transceiver 102 may collect sensor data at regular intervals, in accordance with a predefined schedule, or in response to a trigger event, among other possibilities. The frequency or schedule at which sensor data is obtained may be fixed or configurable.

The mobile transceiver 102 attempts to connect to the asset tracking service 200 to report location and/or sensor data stored in the asset tracking log 224 at regular intervals, in accordance with a predefined schedule, or in response to a trigger event, among other possibilities. The frequency or schedule at which the mobile transceiver 102 attempts to connect to the asset tracking service 200 may be fixed or configurable. The mobile transceiver 102 typically attempts to connect to the asset tracking service 200 using a wireless transceiver such as the cellular transceiver 114. The mobile transceiver 102 has access to multiple wireless services provided by multiple wireless transceivers, each of which provides access to one or more wireless services. In the described embodiment, the multiple wireless transceivers comprise the cellular transceiver 114, WLAN transceiver 116, and Bluetooth transceiver 118. The wireless transceivers may include multiple cellular transceivers 114 in some embodiments, which may be multi-band cellular transceivers 114. The mobile transceiver 102 could also attempt to connect to the asset tracking service 200 using a physical link, either directly or indirectly via the computer 240. Each wireless service supported by the mobile transceiver 102 may be defined by a standard or specification. Non-limiting examples of wireless service described elsewhere in the present disclosure and include 4G Long-Term Evolution (LTE), 3G and 2G, WLAN and Bluetooth.

When the mobile transceiver 102 connects to the cellular network 160, WLAN 150, or computer 240 via Bluetooth and/or USB, the mobile transceiver 102 can send the data log or a portion of the data log (i.e., an unreported portion of the data log) to the asset tracking service 200 through the firewall 210 using a communication network 230. The data log information may be sent using any suitable message format including, for example, a proprietary message format. The mobile transceiver 102 data log typically includes an indicator regarding which data in the data log has been reported and which data in the data log is unreported. For example, in some embodiments, the data log comprises a series of records including and identified by a record identifier (ID). Each record also includes a time at which the record was made, location data and/or sensor data, and a report status indicating whether the record has been reported to the asset tracking service 200. After an unreported record is reported to the asset tracking service 200, its corresponding report status field in the data log is updated.

The mobile transceiver 102 powers-down certain device components when not in use to conserve battery power. For example, the mobile transceiver 102 initiates a low power mode for the cellular transceiver 114 after a reporting time/cycle. The low power mode may be an off mode (also known as an off state) in which the cellular transceiver 114 is unpowered or a sleep mode (also known as a standby mode or suspended operation mode) with low power consumption. The cellular transceiver 114 is then activated from the low power mode at the next reporting time/cycle. Any other wireless transceivers are similarly placed into a low power mode after a reporting time/cycle. The satellite receiver 120 and sensors 130 may also be placed into a low power mode when not obtaining location or sensor data, and then activated from the low power mode at the next measurement time/cycle.

The data logging and data reporting cycles are typically different and need not coincide, although the cycles typically overlap to varying degrees. For example, each reporting cycle typically involves reporting several records of the data log each including location data and/or sensor data. The cycles may overlap in that location data and/or sensor data may be captured as part of a common process at some times or may be captured as part of a separate process performed just prior to reporting logged data to the asset tracking service 200. For example, a wireless transceiver may be awaken for reporting at the same time, or just after, the satellite receiver 120 and/or sensors 130 are awaken and location data and/or sensor data is captured.

The communication system 100 is provided for the purpose of illustration only. The communication system 100 is but one possible configuration of a multitude of possible communication network configurations for use with the mobile transceiver 102. Suitable variations will be understood to a person of skill in the art and are intended to fall within the scope of the present disclosure. For example, while individual networks have been represented for convenience, it will be appreciated that multiple networks of each type and intermediate networks connected to the shown networks may be provided. Also, the communication links represented in FIG. 1 can be implemented using public and/or private networks that can communicate using packet data technologies, such as X.25 or Internet Protocol (IP) based addressing and routing techniques. Some connections can be implemented as secure connections, for example, using Virtual Private Network (VPN) technologies.

Figure 5:
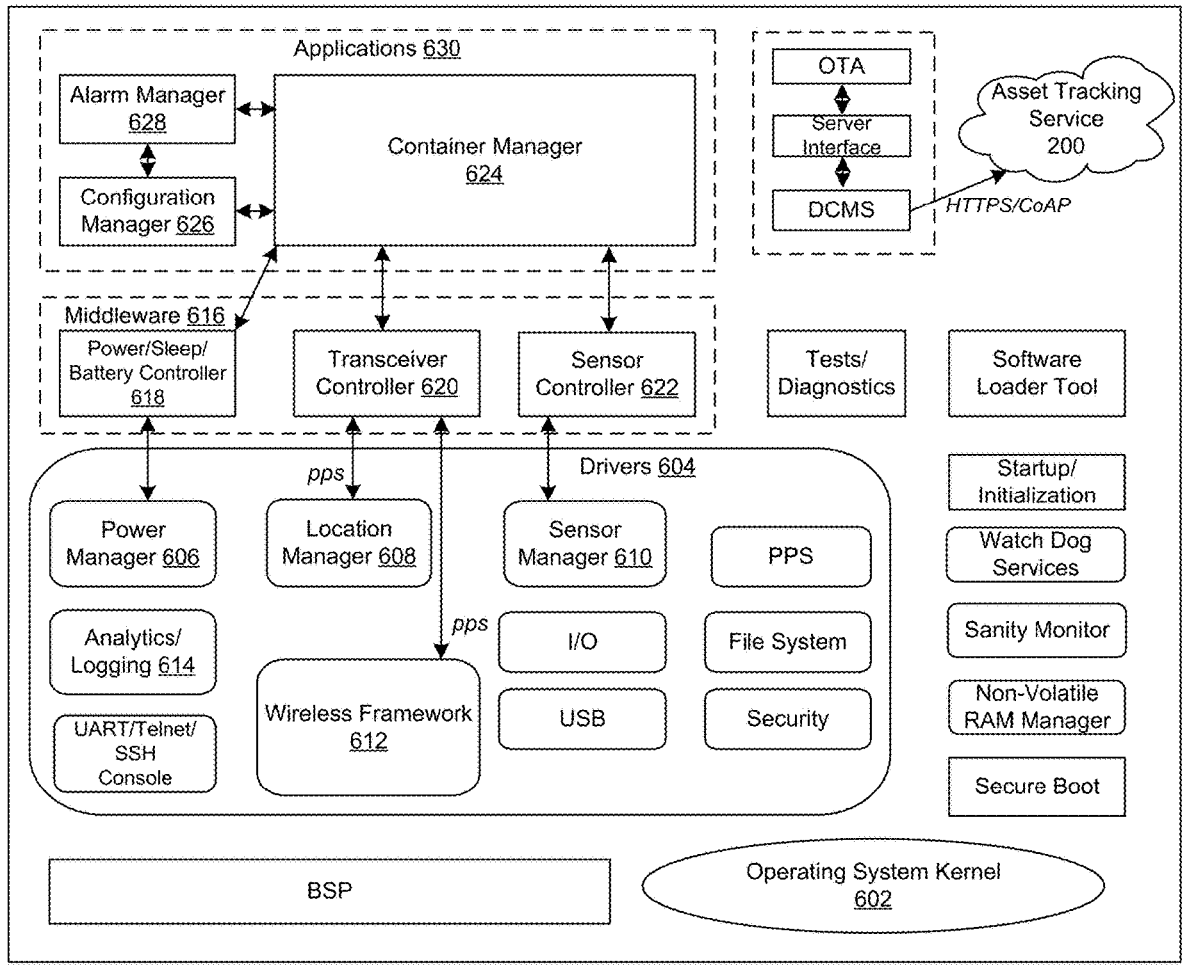
FIG. 5 is a block diagram of the software architecture of the mobile transceiver in accordance with the example embodiments of the present disclosure.

FIG. 5 is a block diagram of the software architecture of the mobile transceiver in accordance with the example embodiments of the present disclosure. The processor 104 may perform a number of processes using the stored software I in the memory 112 by interfacing with various hardware components of the mobile transceiver 102 as shown in the example of FIG. 5. The software modules include an operating system kernel 602, drivers 604, middleware 616 and applications 630. The drivers 604 include a power manager 606, a location manager 608, a sensor manager 610, a wireless framework 612, and an analytics/data logging module 614. The middleware 616 includes a power/battery/sleep controller 618, transceiver controller 620, and sensor controller 622. A number of applications 630 execute on top of the operating system kernel 602 such as a container manager (asset manager) 626, a configuration manager 626 and an alarm manager 628, as described in further detail below.

The container manager 624 collects and packetizes data collected by the mobile transceiver 102, and sends it to the asset tracking service 200 through a server agent interface. The packetized data may use JSON (JavaScript Object Notation) formatting. The container manager 624 may also receive data from the asset tracking service 200 through the asset tracking service 200, which it processes or dispatches to the appropriate module. For example, received device configuration data is dispatched to the configuration manager 626.

The container manager 624 also receives notifications (events) from the server agent interface about network status. For example, whether all data has been transmitted and received by the asset tracking service or whether new data has been received from the asset tracking service.

Events received from the alarm manager 628 include instructions as to what data needs to be gathered and sent to the asset tracking service 200. The container manager 624 follows the instructions received from the alarm manager 628 and collects and packetizes the data that is then transmitted to the asset tracking service 200. For example, an alarm event may specify that location, temperature, humidity and light level should be collected and sent to the asset tracking service 200.

Any data that is not received by the asset tracking service 200 is saved in the file system in memory 112 and an attempt to send the queued data may be made the next time an alarm is triggered and communication is established to the asset tracking service 200. The amount of queued data is based on the capacity of the memory 112. Once the memory 112 is full, older data is overwritten. In some embodiments, the backup data allows storage of 100,000 events with each event having a size approximately equal to 1 KB. The total amount of memory 112 may be 100 MB. The asset tracking service 200 acknowledges any received data so that the mobile transceiver 102 may discard acknowledged data. Alternatively, the data may be maintained within the memory 112, for example, for diagnostic purposes until overwritten.

The container manager 624 also controls the wireless transceivers and satellite receiver 120 through the middleware layer, for example, using a Persistent Publish/Subscribe (PPS) interface provided by the wireless framework, such as that provided by QNX Software Systems Limited.

In some embodiments, virtual sensors are provided. For example, "door" and "contents" sensors may be virtual in that to obtain door open/close status several physical sensors 130, such as accelerometer 136 and light sensor 131 may be used with an algorithm that detects the condition. The same may apply for contents full, empty or half condition. This value depends on an algorithm that considers the container dimensions and readings from the ToF sensor 137. As a result, not all "sensor" data transmitted to the asset tracking service 200 may not be raw readings obtained from physical sensors 130. Instead, some of the sensor data is converted by software on the mobile transceiver and converted to container conditions such as door state, container contents, etc. while other sensor data, such as temperature and humidity is directly obtained from physical sensors 130.

The configuration manager 626 receives, parses and stores device configuration data which stores an alarm profile, and receives and stores the container profile which includes data about the container to which the mobile transceiver 102 is attached. The device configuration data and container profile data may also be stored in the JSON format, and may be compressed and/or encrypted. The encryption/decryption and compression/decompression, if any, is done by the server agent interface and asset tracking service 200. The configuration manager 626 also validates any new device configuration data received from the asset tracking service 200 and reports back any errors.

The assigned device configuration data may be stored in the file system whereas the default device configuration is stored in ROM. Therefore, if the software is re-flashed this would completely update the file system and delete any assigned device configuration that have been downloaded and stored in the file system, which would then have to be obtained from the asset tracking service 200. An OTA update would not delete the configuration files saved in the file system as it uses a patching method to update files.

The alarm manager 618 receives the alarm profile from the configuration manager 626, and sets the alarms based on the active alarm profile. When a new device configuration is received by the configuration manager 626, it informs the alarm manager 628 so that the new alarm profile is applied. The old alarm profile may be deleted.

RTC 160 and at least some of the sensors 130 produce interrupts based on the programmed triggers which wakeup the processor 104. Sensors which do not produce interrupts cannot wakeup the processor 104. Instead, such sensors, when associated with an enabled alarm of the active alarm profile, are polled every time the processor 104 wakes up due to any of the other alarm types.

The RTC 160 is used for date-based and time-based alarm since it runs even when the mobile transceiver 102 is in deep sleep mode. The RTC 160 is configured with the next possible alarm date/time selected by the alarm manager 628 by searching all date and time alarms. Once the next date/time trigger is set in the RTC 160, it will generate an interrupt to wake up the processor 104 when the date/time is reached. It is possible for two or more date/time alarms to fall on the same calendar date and time. In such cases, when the RTC 160 may interrupt fire and the alarm manager 628 executes the instructions for all the matching date/time alarms. It is possible for the next date or time alarm to be due while processing an RTC interrupt generated alarm. For example, this can occur if the processing for a date alarm takes 3 minutes but the next time alarm is in 2 minutes. In such cases, the alarm manager 628 process the due alarm, as if it had triggered an interrupt, before programming the RTC 160 with the next date/time.

For maximum flexibility date-based and time-based alarms may be specified in local time based on container current location, specified using UTC time (Coordinated Universal Time), for example, as defined by International Telecommunications Union Recommendation (ITU-R TF.460-6). For simplicity, alarms may be limited to UTC time. To simplify time tracking, the RTC may be programmed with UTC time with all alarm events should be configured in UTC time. Time may be specified in 24 hr time hh:mm:ss format and date may be specified in dd:mm:yyyy format. Alternatively, date-based and time-based alarms may be specified in a given time zone, for example, the time zone for the customer headquarters. When local time is supported, UTC time can be converted to local time based on the time zone in which the container is located for RTC setup (for example, based on the time zone indicated by the cellular network) and alarm processing.

The alarm manager 628 configures the interrupt capable sensors based on the active alarm profile and possibly the enabled/disable status of the alarms in the active alarm profile, if supported. The sensors send an interrupt signal to wake up the alarm manager 628 when a trigger condition is detected. The alarm manager 628 wakes up and handles the interrupt, sending the corresponding event to the container manager 624 with the action instructions.

It is possible for two or more sensor alarms to be triggered at the same time, since a sensor value may satisfy the condition parameters for more than one alarm. In such cases, the alarm manager gathers the action instructions for all the matching alarms.

Nested alarm interrupts are also possible. For example, while processing an interrupt from the RTC 160 or sensor 130 another interrupt may be triggered. The alarm manager 628 handles each interrupt by queueing the interrupt requests and processing the requests in order. To facilitate processing and avoid endless loops, interrupts being processed may be acknowledged and re-enabled only after all processing is completed. After processing all triggered alarms, the alarm manager 628 may examine future alarm events and choose to process the future alarm events if scheduled to happen within a short period of time. This avoids waking up shortly after going to deep sleep.

The Power/Sleep/Battery Controller 618 provides the functions for managing the device power, battery and sleep mode, which may be implemented as an API that interfaces with the drivers. The Power/Sleep/Battery Controller 618 comprises three submodules a power manger, a battery manager, and a sleep manager. The power manger performs power management, such as setting correct voltage levels and CPU frequency to save device power consumption based on load.

The battery manager detects that a low battery level has been reached and the remaining expected battery life is below a critical threshold. When below the critical threshold, this condition will be sent to the asset tracking service 200. The battery manager may also provide a fuel gauge which provides battery status, charge level percentage, current voltage, consumption rate, expected life expectancy, etc. Alternately, if no fuel gauge is available, the battery manager will provide whatever information can be obtained, if any, for example, by reading the voltage level if possible.

The sleep manager performs the setting of the hardware into sleep mode. The container, configuration and alarm managers inform the sleep manager whether the modules are active or idle by using an API provided by the sleep manager. For this purpose, a shared memory semaphore, a shared memory bit map, an API interface, etc. may be used. Activity on the data port 122 indicates that a manufacturing tests and/or user debugging is being run, and that mobile transceiver 102 should not go to sleep.

To enter sleep in some embodiments, the wireless transceivers are powered off, some sensors may be powered off (for example, if there are no enabled alarms currently triggering on them), watchdog functions are disabled, the RTC 160 is to run and the device is set to run using the low speed clock, and the processor is set to sleep. The satellite receiver 120 is kept awake. Alternatively, the satellite receiver 120 may be powered off.

The alarm manager 628 sends the event to end sleep. Alarms triggered by interrupts are used to wake up the processor 104 from sleep. To complete the wake up, an event or a software interrupt is sent from the alarm manager 628 to the sleep manager. The container manager 624 and the configuration manager 626 inform the sleep manager that the modules are active as soon as events are received and the modules are waken up. When all processing has been completed by the modules, the modules send notifications to the sleep manager 628 that the modules have completed processing and ready to sleep.

To exit sleep in some embodiments, the wireless transceivers are powered on, some sensors that were powered off are powered on if needed by the active alarm profile, watchdog functions are enabled if needed, the RTC 160 is to run, the device is set to run using the high speed clock, and the processor is awaken. The satellite receiver 120 may be awaken if powered off and if needed.

Alternatively, the wireless transceivers power on/off determination could be implemented in the container manager 626 since it will know when the wireless transceiver is needed and when it may be turned off.

Route Monitoring Service

The mobile transceiver 102 is configured to provide route monitoring based on a predefined route. Route monitoring may be provided as a value added service. The route may be defined by a travel itinerary that defines a number of waypoints including an origin, destination and a plurality of intermediate waypoints between the origin and destination. The travel itinerary may also specify an expected time of arrival (ETA) at various waypoints. The ETAs may be based on the mode(s) of transportation. The travel itinerary may be downloaded from the asset tracking service 200 at or before the beginning of a trip. An example travel itinerary is presented in the table below.

| Event | Waypoint | GNSS coordinates | Wireless Transceiver | Region | Technology |
|---|---|---|---|---|---|
| 1 | Origin | GNSS | Transceiver 1 | Asia | 2G/3G |
| ... | In transit | range 1 | GNSS only | Pacific | |
| n-1 | In transit | GNSS range 2 | Transceiver 2 | EMEA | LTE (3G fallback) |
| n | Destination | GNSS range 3 | Transceiver 3 | North America | LTE |

Each waypoint in the travel itinerary includes a number of parameters including a waypoint descriptor, GNSS coordinates, a preselected wireless transceiver, a geographical region, and a wireless transceiver technology. Not all parameters may be defined for each wakeup event and different parameters may be defined in other embodiments. The available wireless coverage for the particular geographic location and/or a preferred wireless carrier, from a list of available carriers associated with each wireless transceiver (if there is more than one wireless carrier available at the waypoint) may also be specified in the travel itinerary.

In the shown example, the travel itinerary specifies a preselected (or predetermined) wireless transceiver for at least some of the waypoints in the travel itinerary. For example, if more than one cellular transceiver 114 is provided. The preselected wireless transceivers are selected by the asset tracking service 200 based on the wireless network availability at the various waypoints. The selection of the wireless transceiver may be based on the signal strength database. In a long-range application in which the mobile transceiver 102 may be out of wireless coverage for an extended period of time, the mobile transceiver 102 may be configured to wake up to obtain a location fix and/or acquire sensor data (e.g., environmental data) at one or more waypoints along the planned route, and optionally report data to the asset tracking service 200.

The waypoint descriptors in the example travel itinerary include "Origin", "In Transit", and "Destination". However, more detailed waypoints and waypoint descriptors may be provided in other embodiments including, for example, one or more of "Rail", "Ship", "Street", "Dock", "Home", "Warehouse", "Distribution Centre", "Outside" or "Inside". Also, while a geographical region distinct from the waypoint descriptor is provided in the example travel itinerary (e.g., Asia Pacific, Europe, the Middle East and Africa (EMEA), North America, South America, etc.), the geographical region may be omitted in other embodiments. Alternatively, the particular geographic location may be defined in terms of a city name or code, or country name or code. The waypoint descriptors are optional and may be omitted in other embodiments.

The route defined by the travel itinerary may be selected based on one or more of a number of possible factors. In some examples, the route is based on a signal strength database 220 connected to the asset tracking service 200 that includes a set of records correlating cellular signal strength with GNSS coordinates GPS coordinates) so that wireless (cellular) service should be available at least some, preferably all, of the waypoints in the travel itinerary so that wireless (cellular) service for reporting data to the asset tracking service 200 should be available for most or all of the planned route. In other examples, the route is based on a shorter distance. In yet other examples, the route is based on a shorter time. The route may also be selected to take into account one or more avoidances such as unpaved roads, low clearances, high traffic density or toll roads. The route may also be selected to take into account one or more preferences such as highways over local roads.

While the travel itinerary has been described as including certain data items and as having a certain data structure, the present disclosure is not intended to be limited to the described data structure. Any data structure in which the described data items are provided and associated with each other may be used, whether those data items are stored in a travel itinerary or elsewhere. The waypoint ID and descriptors are optional and may be omitted in other embodiments.

In examples in which the route is based on a signal strength database 220, one or more alarms may be set to occur in at least some of the waypoints in the travel itinerary so that wireless (cellular) service for reporting data to the asset tracking service 200 should be available for most or all of the planned route. For example, one or more date-based or time-based alarm may be set to occur at a waypoint in the travel itinerary. The date-based or time-based alarm may then be adjusted based on the progress along the planned route and/or measured signal strength at the waypoint and/or optionally a local copy of the signal strength database 220.

In examples in which the route is based on a signal strength database 220, the signal strength database 220 may be generated or populated from data obtained by individual mobile transceivers 102 which store cellular signal strength information measured when attempting to connect to a cellular RAN after obtaining a location fix with the satellite receiver 120, and periodically send this information to the asset tracking service 200 (for example, during a reporting cycle). The cellular signal strength information is stored in the internal memory 112 of the mobile transceiver 102 with a corresponding GNSS coordinate associated with the location at which the cellular signal strength information was determined. The mobile transceivers 102 may also store other information in addition to the cellular signal strength information.

Each record in the signal strength database 220 includes at least one signal strength indication and a corresponding GNSS coordinate associated with the location at which the at least one signal strength indication was determined. The signal strength indication may be a received signal strength indicator (RSSI), reference signal received power (RSRP), reference signal received quality (RSRQ) or received signal code power (RSCP) depending on the type of cellular transceiver 114 and the type of cellular networks available.

The signal strength database 220 may be an aggregation of the cellular signal strength information from a plurality of the mobile transceivers 102. The asset tracking service 200, after receiving cellular signal strength information from a particular mobile transceiver 102, update the signal strength database 220 with the received cellular signal strength information by aggregating the received cellular signal strength information from the particular mobile transceiver 102 with the data in the signal strength database 220.

The signal strength database 220 may be an aggregation of the data collected from individual mobile transceivers 102 with other sources of data to increase the amount of the data in the signal strength database 220. The other sources of data may be based on cellular signal strength information gathered by cellular phones. The other sources of data may comprise data collected by a wireless carrier associated with both the mobile transceivers 102 and the cellular phones, a wireless carrier not associated with the mobile transceivers 102, or possibly a third party resources, such as a third party database may be accessible over the Internet.

The signal strength database 220 may also comprise summary or statistical information about the cellular signal strength information at a given GNSS coordinate based on the aggregated data. The summary or statistics information may include one or more of a high signal strength value, low signal strength value, average signal strength, mean signal strength, etc. The summary or statistical information is calculated by the asset tracking service 200 based on the aggregated data. The summary or statistics information may be determined separately for each of the various sources of data, allowing the summary or statistics information to be filtered by the data source. The summary or statistics information may be included as part of the signal strength database 220 or may be maintained separately. The summary or statistical information may be based on the measured signal strength indication for one or more multiple towers.

The signal strength database 220 may include the summary or statistical information about the cellular signal strength information in addition to, or instead of, measured signal strength indication information at a given GNSS coordinate. For example, each record in the signal strength database 220 may include an average signal strength indication and a corresponding GNSS coordinate.

The signal strength database 220 may also include derived information derived from the aggregated data. The derived information may comprise estimated data which may be generated by the asset tracking service 200. For example, the estimated data may comprise estimated signal strength indications for GNSS coordinates for which no data is available using measured data in signal strength database 220 and interpolation and/or extrapolation techniques based on signal propagation models. Estimate records may be generated for GNSS coordinates at fixed intervals to fill in gaps in the signal strength database and/or decrease the distance between records. This is illustrated in FIG. 4.

Figure 4:
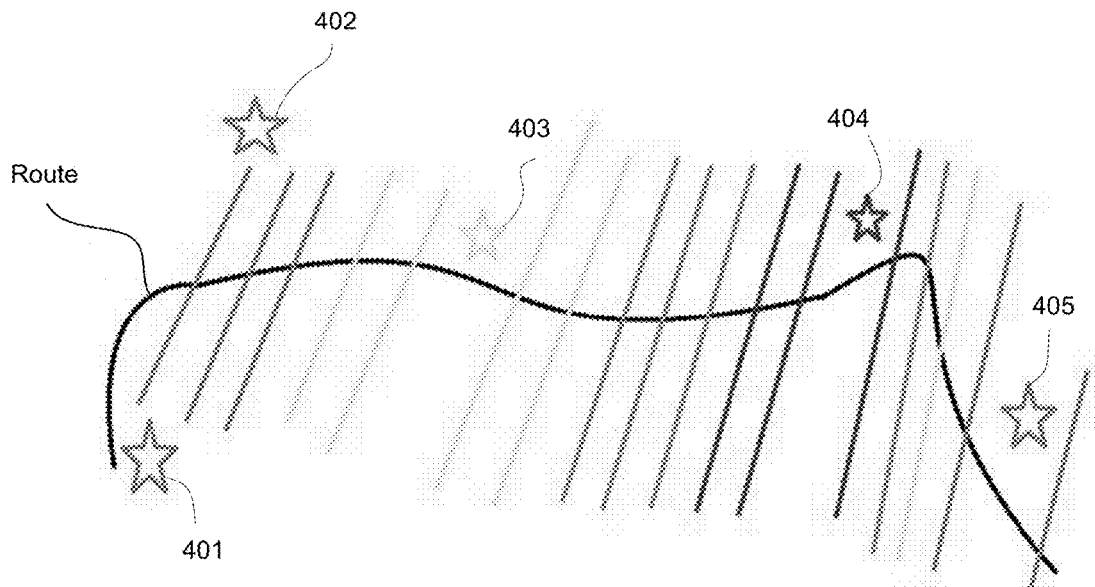
FIG. 4 is a schematic representation of estimated signal strength data along a route.

FIG. 4 shows a schematic representation of estimated signal strength data along a route taken by the mobile transceiver 102. Five coordinates in the signal strength database 220 are shown at 401, 402, 403, 404 and 405. The lines indicate a derived signal strength based on the nearest data points in the signal strength database 200, namely the data points 401, 402, 403, 404 and 405. The derived signal strengths may be no signal, weak signal, average signal or strong signal. The mobile transceiver 102 can use the derived signal strengths in a similar manner to measured signal strength indications.

The derived information may comprise a signal strength rating derived from the average signal strength indication. The signal strength rating may be one of a number of signal strength ratings, such as no signal, weak signal/low signal, average signal/medium signal, or strong signal/high signal. The signal strength rating may be determined by the asset tracking service 200 by comparing the average signal strength indication to signal strength thresholds defining the signal strength ratings. While example qualitative indicators of signal strength ratings have been described, other qualitative indicators could be used in other embodiments, such as a numerical rating from 1 to 10, to provide increased precision.

Rather than each record including a particular GNSS coordinate as described above, each record may include a range of GNSS coordinates. The ranges may be selected to eliminate gaps in signal strength information for a geographic area and to avoid any overlap between ranges.

The derived information fills in gaps in the signal strength database 220. It may assist the asset tracking service 200 in selecting a route having improved wireless (e.g., cellular) access. It may also assist in predetermining whether to activate the cellular transceiver 114 and attempt connecting to the cellular network 160 at a given location. It may also assist the mobile transceiver 102 in preselecting a wireless transceiver, such as a cellular transceiver 114 for attempt connecting to the cellular network. This conserves processing resources and power of the mobile transceiver 102.

While the described embodiments related to a cellular signal strength database for use with the cellular transceiver, the teachings of the present disclosure could be applied to other wireless radio access technologies such as, for example, Wi-Fi. In one example, the signal strength database may be a wireless signal strength database for use with the wireless transceiver 116, with the signal strength database based on the signal strength of wireless access points in a wireless network conforming to the IEEE 802.11p standard. The wireless access points may be located along roadsides or elsewhere. IEEE 802.11p is an approved amendment to the IEEE 802.11 standard that adds wireless access in vehicular environments (WAVE), a vehicular communication system. It defines enhancements to 802.11 that support Intelligent Transportation Systems (ITS) applications, including data exchange between high-speed vehicles and between the vehicles and roadside infrastructure in the licensed ITS band of 5.9 GHz (5.85-5.925 GHz). IEEE 1609 is a higher layer standard based on the IEEE 802.11p.

Example Method of Operating a Mobile Transceiver

Figure 3:
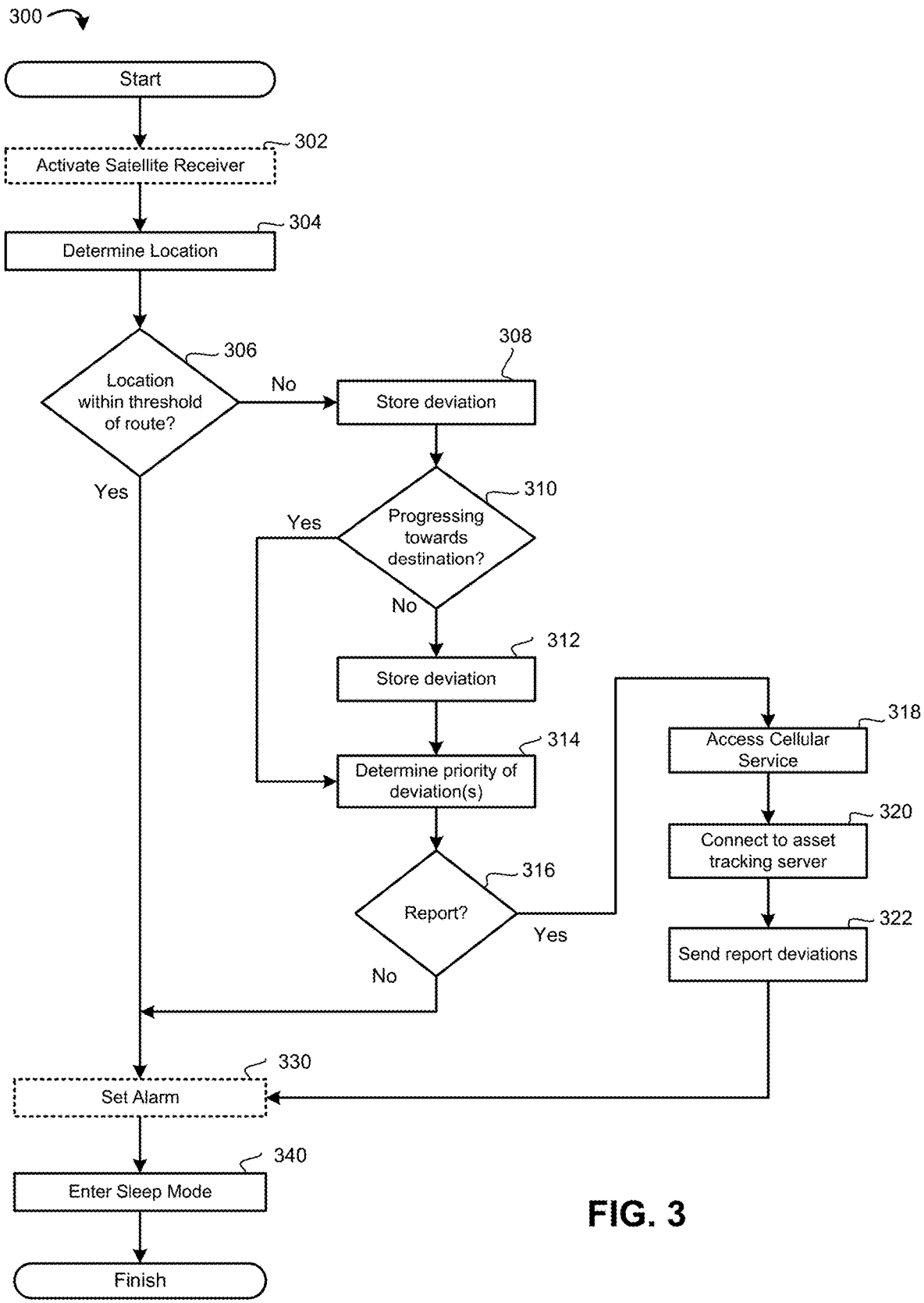
FIG. 3 is a flowchart illustrating an example embodiment of a method of operating a mobile transceiver in accordance with one embodiment of the present disclosure.

FIG. 3 is an example flowchart of a method 300 of operating a mobile transceiver 102 such as a GNSS tracking device in accordance with one example embodiment of the present disclosure. The method may be carried out by software executed by a processor of the respective devices. Coding of software for carrying out such a method 300 is within the scope of a person of ordinary skill in the art provided the present disclosure. The method 300 may contain additional or fewer processes than shown and/or described, and may be performed in a different order in other embodiments. Machine readable code executable by the processor to perform the method 300 may be stored in a machine readable medium such as a memory.

At 302, the processor 104 and/or satellite receiver 120 optionally wake up (e.g., activate) from a low power mode in response to an alarm. An alarm is a configurable wakeup event which causes the mobile transceiver 102, or a subsystem of the mobile transceiver 102 such as the satellite receiver 120 or one or more sensors 130, to wake up from a low power mode such as a sleep mode and perform configured actions (e.g., measurement of location and sensors) which are then logged and/or reported to the asset tracking service 200. Alternatively, the satellite receiver 120 may remain in the full power mode.

Alarms are defined by a trigger type, a trigger condition to be satisfied for the alarm to be triggered, and one or more actions to take when the alarm is triggered. The alarm types are date-based, time-based, sensor-based or location-based (geofence alarms). Alarms may be active (enabled) or inactive (disabled) and alarms may be enabled or disabled by other alarms that have been triggered. For example, if the temperature surpasses a trigger point, another alarm may be enabled to trigger if the temperature decreases below a lower value. Disabled/inactive alarms are ignored. In the described example the alarm may be a date-based or time-based alarm which wakes up the processor 104 and possibly other subsystems at a fixed time or at regular intervals among other possibilities. The frequency or schedule at which the location is determined may be fixed or configurable.

At 304, the mobile transceiver 102 determines its location (geolocation) using the satellite receiver 120. The mobile transceiver 102 uses signals received by the satellite receiver 120 from a plurality of satellites in the satellite network 180 to determine its location. The mobile transceiver 102 stores the determined location, typically in terms of latitude and longitude, and a time at which the location was determined in a data log stored in the memory 112 of the mobile transceiver 102.

At 306, the mobile transceiver 102 determines whether the determined location is within a first threshold distance of the route defined by the travel itinerary by comparing the GNSS coordinates of the determined geolocation with the GNSS coordinates in the travel itinerary. The first threshold distance may be configurable depending on tracking requirements, for example, based on customer demands, the asset condition of the asset being tracked, or the travel mode describing a mode of transportation being taken. When strict compliance with the travel itinerary is desired, the first threshold distance may be lower, such as 100 m to 200 m. When a strict compliance with the travel itinerary is not desired, the first threshold distance may be higher such as 1 km to 2.5 km.

The asset condition may be any one of a location, sensor data (e.g., temperature, humidity, door open/closed, etc.), time, alarm status (e.g., whether any alarms triggered, alarms that are triggered), asset type, asset contents, asset value, driver profile or other asset condition. The asset types may include cargo/container or vehicle, or more specifically oil truck, milk truck, service truck, freight truck, taxi/limo, rental car, intermodal container, crate, tank container, gas tank, insulated shipping container, flexible intermediate bulk container, intermediate bulk container, etc. The asset contents may include refrigerated, non-refrigerated, perishable, dry good cargo, farm produce, construction materials, logging goods, oil, weapons, aviation contents, flammable liquids, liquid hydrogen or other super cooled liquids, poisonous materials/liquids, radioactive materials, explosive, radioactive, confidential documents, poisonous, flammable, perishable, dry goods, logs/woods, etc. The asset value may be high value or low value (or non-high value). The driver profile may be good, bad or other rating.

The travel modes may include, but are not limited to, "Rail", "Ship", "Street", "Dock", "Home", "Warehouse", "Distribution Centre", "Outside", "Inside", "Parked", etc.

When it is determined that the determined location is within a first threshold distance of the route defined by the travel itinerary, operations proceed to 330, described below. Alternatively, in other embodiments operations may proceed to 310, described below. When it is determined that the determined location is not within the first threshold distance of the route defined by the travel itinerary, operations proceed to 308 at which the deviation is stored, for example, in the asset tracking log or a distinct deviation log.

At 310, the mobile transceiver 102 optionally determines whether the mobile transceiver 102 is progressing towards its destination. In some examples, a heading or direction of travel of the mobile transceiver 102 is calculated using GNSS coordinates obtained using the satellite receiver 120 over a threshold duration, such as 1 minute. Alternatively, the electronic compass 139 may be used to determine the heading or direction of travel of the mobile transceiver 102 using, for example, an average measurement over a threshold duration. In both case, the heading or direction may be determine over a threshold duration to reduce false readings caused by short term deviations from the route, such as detours.

A planned heading or direction of travel is also calculated using a plurality of GNSS coordinates specified in the travel itinerary closest to the determined location. The planned heading or direction of travel represents what the heading or direction of travel of the mobile transceiver 102 should be if the mobile transceiver 102 is progressing towards its destination. The planned heading or direction takes into account the non-linearity of longer distance routes. Alternatively, a heading or direction of the destination specified in the travel itinerary relative to the determined location may be determined based on the respective GNSS coordinates.

The mobile transceiver 102 then determines whether the calculated heading or direction of travel of the mobile transceiver 102 is within a threshold deviation of the planned heading or direction of travel (or the heading or direction of the destination). When it is determined that the calculated heading or direction of travel of the mobile transceiver 102 is within a threshold deviation of the planned heading or direction of travel, operations proceed to 314, described below. When it is determined that the calculated heading or direction of travel of the mobile transceiver 102 is not within a threshold deviation of the planned heading or direction of travel, operations proceed to 312 at which the deviation is stored, for example, in the asset tracking log or a distinct deviation log.

At 314, the mobile transceiver 102 optionally determines a priority of the deviation(s) and stores the determined priority at least temporarily in memory. In one example, deviations may be high priority or low priority. A deviation from the planned route may be determined to be low priority when the mobile transceiver 102 is not within the first threshold distance of the route defined by the travel itinerary but is within a second threshold distance of the route defined by the travel itinerary, the second threshold distance being larger than the first threshold distance. The second threshold distance may be, for example, an amount double the first threshold distance. A deviation from the planned route may be determined to be high priority when the mobile transceiver 102 is not within the first threshold distance or second threshold distance.

In another example, a deviation from the planned route may be determined to be low priority when the mobile transceiver 102 is determined to be progressing towards its destination whereas a deviation from the planned route may be determined to be high priority when the mobile transceiver 102 is determined to be not progressing towards its destination. The lack of progress towards the destination may be an indication of theft rather than a detour or other justified deviation from the planned route which may cause a delay rather than a loss of the asset being tracked.

At 316, the mobile transceiver 102 optionally determines whether to report the deviations from the planned route. In some examples, deviations are reported when a high priority deviation has been detected. In other examples, deviations are reported when a threshold number of deviations have been detected, or deviations have been detected for a threshold duration. In other examples, all deviations are reported.

At 318, the mobile transceiver 102 activates the cellular transceiver 114 from a low power mode, such as a sleep mode. The activating of the wireless transceiver may be performed by the main processor 104 or a baseband processor (not shown) of the cellular transceiver 114, depending on the embodiment. The cellular transceiver 114 then searches (e.g., scans) for cellular service by searching for cellular signals. The cellular transceiver 114 may search for cellular signals in accordance with a priority sequence of frequencies which, for example, may be based on preferred carriers, for example, frequencies used by the carrier of the user's home network and/or carriers that have an advantageous partnering agreement with the carrier of the user's home network. The priority sequence may be a list of frequencies sorted or ranked in a descending order of priority. The scanning comprises measuring signal strength indications associated with one or more signals received from one or more respective cellular towers.

When cellular service is not available, the mobile transceiver 102 may update the cellular signal strength data 223 stored in memory 112 to indicate that no signal was detected at the determined location of the mobile transceiver. When cellular service is available, the mobile transceiver 102 may also update the cellular signal strength data 223 stored in memory 112 by storing at least the determined signal strength indications and the determined location of the mobile transceiver 102. The mobile transceiver 102 then accesses (or connects) to the cellular service. If more than one cellular service is available, the mobile transceiver 102 selects one of the cellular services based on selection criteria, such as the signal strength indication. For example, the cellular service having the highest signal strength indication may be selected.

At 320, the mobile transceiver 102 connects to the asset tracking service 200.

At 324, the mobile transceiver 102 sends an alert to the asset tracking service 200 that one or more deviations from the route have been detected. The alert may include a priority ranking of the alert, such as a designation of either low priority or high priority, based on the determination in 314 of the priority of the deviation(s). The priority ranking may be used for further processing by the asset tracking service 200. The alert may also include details about the deviations, such as the amount of deviation from the planned route and whether the mobile transceiver 102 is progressing towards its destination, and possibly a last determined (e.g., current) location. The alert may also include an estimated delay in an estimated time of arrival at the destination, if any, calculated by the mobile transceiver 102 based on a calculated speed of travel at which the mobile transceiver 102 is moving and the amount of the determined deviation from the planned route which are determined by the mobile transceiver 102. The speed of travel may be determined or calculated using location data obtained from the satellite receiver 120 (either instantaneously or over a threshold duration) or the asset tracking log 224 over a threshold duration. The calculation over a threshold duration provides a more reliable longer term average. The calculated speed and/or estimated delay is stored at least temporarily in the memory.

The asset tracking service 200 stores the one or more deviations in the alert in an asset tracking database (not shown) which may be accessed by a user, for example, using a web-based portal. A customer may login over the network to the asset tracking service 200 using a computer system 240, for example, by providing a valid username and password combination. The route monitoring may be provided as a value added service provided by a third party service provider who maintains or controls the asset tracking service 200. An additional monthly/yearly charge may be applied to access the route monitoring and/or route monitoring alert feature. The route monitoring may be added while the mobile transceivers 102 are in transit, for example, via an over-the-air update of the device configuration by the asset tracking service 200.

Once the customer has logged in to web-based portal, the customer may be presented with a graphical user interface (GUI), such as a web-based interface, that permits the customer to add mobile transceivers 102 to their customer account, describe the asset with which the mobile transceiver 102 is associated (e.g. container ID, container measurements, contents, etc.), update alarm profiles for existing mobile transceivers 102, and/or view the retrieved data from existing mobile transceivers 102 associated with their customer account such as deviations from the planned route. The web-based interface may also indicate mobile transceivers 102 that have triggered alarm conditions.

The asset tracking service 200 may calculate an estimated delay, if any, based on a determination of the speed at which the mobile transceiver 102 is moving and the amount of the determined deviation from the planned route, if this information is not included in the alert received from the mobile transceiver 102. The speed of travel may be determined or calculated using location data in the asset tracking log 224 provided to the asset tracking service 200 by the mobile transceiver 102. The estimated delay may be indicated by the asset tracking service 200 in the web-based portal.

The priority ranking may automatically trigger further processing by the asset tracking service 200 upon receiving the alert. In one example, a high priority alert causes an email or instant message to be sent to one or more designated addresses whereas a low priority alert does not cause an email or instant message to be sent. In another example, both low and high priority alerts may cause an email or instant message to be sent to one or more designated addresses but the content and/or format of the message may differ. For example, the high priority alert may cause an urgent flag and/or subject line to be used. The message may include information about the deviations including, for example, the amount of deviations from the route and whether the mobile transceiver 102 is progressing towards its destination, and the last determined location.

The mobile transceiver 102 may also send the asset tracking log 224 or a portion thereof and/or the cellular signal strength data 223 to the asset tracking service 200.

While not shown, after the asset tracking service 200 has received the alert and/or other data from the mobile transceiver, a confirmation message may be sent by the asset tracking service 200 to the mobile transceiver 102 indicating that the data has been successfully received by the asset tracking service 200. The mobile transceiver 102, on receiving the confirmation message, may then clear the deviation data, asset tracking log 224 and/or cellular signal strength data 223 from the memory 112. This conserves memory and facilitates "smart" uploads from the mobile transceiver 102 in which only new data is uploaded to the asset tracking service 200. In other embodiments, separate confirmation messages may be sent for each data type. In other embodiments, no confirmation messages are sent.

At 330, one or more alarms may be set based on the signal strength at the determined location or possibly a local copy of the signal strength database 220 stored in the memory 112 of the mobile transceiver 102. The signal strength database 220 may be provided as part of the device configuration data at the factory or anytime thereafter, for example, by an OTA update. The alarms may be new alarms or existing alarms which are adjusted based on the signal strength. For example, a time-based alarm may be decreased in frequency when the mobile transceiver 102 is travelling through an area of poor reception that was not expected (e.g., change alarm from every 10 mins to every 1 hour) or may be increased in frequency when the mobile transceiver 102 is travelling through an area of good reception that was not expected (e.g., change alarm from every 1 hour to every 10 minutes).

For another example, date-based or time-based alarms having actions that involve the cellular transceiver 114 may be adjusted based on the signal strength at the determined location and a determination of the speed at which the mobile transceiver 102 is moving. The speed of travel may be determined or calculated using location data obtained from the satellite receiver 120 or the asset tracking log 224. The speed may be determined using one of many different techniques based on the satellite receiver 120 and/or sensors 130. For example, the speed may be determined in real-time using the satellite receiver 120. In another example, the speed may be determined using a change in GNSS coordinates between the current alarm and the previous alarm and the time of the current alarm and previous alarm and optionally the route taken by the mobile transceiver 102, which may be specified by the travel itinerary. This approach may be advantageous over a real-time determination because it provides a longer time average of the travelling speed. However, this approach assumes a linear path between alarms/wakeups which, over longer periods of time, introduces error. Taking the route into account, for example, by calculating (or approximating) displacement between points along the route rather than the linear distance between GNSS coordinates may reduce the error in calculating speed. When the determined location does not correspond to a location in the travel itinerary, the location in the travel itinerary closest to the determined location may be used.

Next, the processor 104 identifies one or more waypoints in a travel itinerary at which cellular service is likely to be available at the determined location based on the determined location and the measured signal strength and/or optionally a local copy of the signal strength database 220. Next, the processor 104 determines one or more estimated time of arrivals (ETAs) at the identified one or more of the next waypoints based on the calculated speed. The processor 104 then uses the determined ETAs to set or adjust one or more alarms to be triggered, which may be date-based or time-based alarms involving the cellular transceiver 114.

For alarms involving the cellular transceiver 114 (alarms with reporting actions), the alarms may be set to coincide with the ETA at a location for which cellular service is likely, as noted above. The mobile transceiver 102 may calculate an ETA at the immediately next waypoint, a number of future waypoints in the travel itinerary, or all remaining waypoints between the determined location and the destination. It will be appreciated that the greater the number of waypoints for which an ETA is calculated, the more error may be introduced. However, if the ETAs are recalculated at every wakeup and the alarms adjusted at every wakeup, the error associated with the next waypoint may be kept relatively low.

It will be appreciated that adjusting future alarms based on signal strength of determined location as described above increases the likelihood that when the cellular transceiver 114 is activated from a low power mode that connection to a cellular network will be successful, thus saving power that would be wasted on activating the cellular transceiver 114 when connection to a cellular network is unlikely to be successful.

At 340, a low power mode is initiated for the mobile transceiver 102 or some of its subsystems as described above.

The steps and/or operations in the flowcharts and drawings described herein are for purposes of example only. There may be many variations to these steps and/or operations without departing from the teachings of the present disclosure. For instance, the steps may be performed in a differing order, or steps may be added, deleted, or modified.

While not shown in the above-described embodiments, deviations from the planned route may be inferred by the asset tracking service 200 when scheduled reporting messages from the mobile transceiver 102 are not received at the intended times in embodiments in which date-based and/or time-based wakeups are also planned along the route for when the cellular service is likely to be available, based on the signal strength database 220, to increase power efficiency and/or convenience. When a message is missed, this may indicate that the mobile transceiver 102 is off course or has been damaged.

The above-described methods provide power efficient global and long-range tracking methods that reduce power consumption and extend the expected life of the battery of the mobile transceiver. As noted above, the mobile transceiver typically has a cyclical operation of sleep and wake states. The wake state typically involves fetching a GPS location and/or obtaining and/or processing sensor data and transmitting the data to an asset tracking service 200 via a cellular network. Transmission of the cellular data is typically the most power consuming event. It involves booting up the cellular transceiver 114, locating a cellular network, establishing a connection to the cellular network, and establishing a connection to the asset tracking service 200 and transmitting the necessary data.

The present disclosure provides a power saving scheme for network access in which the route to be followed by the asset and mobile transceiver 102 is planned in advance based on a signal strength database 220 connected to the asset tracking service 200 that includes a set of records correlating cellular signal strength with GNSS coordinates (e.g., GPS coordinates) so that wireless (cellular) service should be available at least some, preferably all, of the waypoints in the travel itinerary so that wireless (cellular) service for reporting data to the asset tracking service 200 should be available for most or all of the planned route. This increases the likelihood that the cellular transceiver 114 is activated only when connection is likely. This avoids unnecessarily wasting power by activating (e.g., booting) cellular transceiver 114 when there is weak or no coverage. The cellular transceiver 114 also enters a low power mode (e.g., shuts down) if it is activated but a connection cannot be made. This avoids the unnecessarily wasting power by re-trying to establish the cellular network connection. The signal strength database may also be updated when a connection is expected but a connection cannot be made.

While the present disclosure is described, at least in part, in terms of methods, a person of ordinary skill in the art will understand that the present disclosure is also directed to the various components for performing at least some of the aspects and features of the described methods, be it by way of hardware components, software or any combination of the two, or in any other manner. Moreover, the present disclosure is also directed to a pre-recorded storage device or other similar machine readable medium including program instructions stored thereon for performing the methods described herein.

The present disclosure may be embodied in other specific forms without departing from the subject matter of the claims. The described example embodiments are to be considered in all respects as being only illustrative and not restrictive. The present disclosure intends to cover and embrace all suitable changes in technology. The scope of the present disclosure is, therefore, described by the appended claims rather than by the foregoing description. The scope of the claims should not be limited by the embodiments set forth in the examples, but should be given the broadest interpretation consistent with the description as a whole.

The invention claimed is:

1. A method of monitoring a route of a mobile transceiver, comprising:
   determining by the mobile transceiver a location of the mobile transceiver using a satellite receiver;
   determining by the mobile transceiver whether the determined location deviates from a planned route;
   in response to a determination that the determined location deviates from the planned route, determining a priority of the deviation from the planned route based on a distance of the determined location of the mobile transceiver from the planned route, wherein the determination that the determined location deviates from the planned route is when the mobile transceiver is not within a threshold distance of the planned route;
   in response to a determination that deviation from the planned route is a low priority deviation, maintaining a cellular transceiver of the mobile transceiver in a low power mode, wherein the low priority deviation is determined when the mobile transceiver is determined to be progressing towards its destination; and
   in response to a determination that deviation from the planned route is a high priority deviation, activating the cellular transceiver of the mobile transceiver from the low power mode, and sending an alert from the mobile transceiver to an asset tracking service via the cellular transceiver, wherein the high priority deviation is determined when the mobile transceiver is determined to be not progressing towards its destination.

2. The method of claim 1, further comprising:
initiating the low power mode for the cellular transceiver subsequent to sending the alert from the mobile transceiver to the asset tracking service.

3. The method of claim 1, wherein the alert comprises information regarding the determined deviation from the planned route and the determined location.

4. The method of claim 1, further comprising:
sending by the asset tracking service an electronic message to one or more designated addresses in response to receiving the alert.

5. The method of claim 4, wherein the electronic message comprises information regarding the determined deviation from the planned route and the determined location.

6. The method of claim 1, further comprising:
storing the determined deviation from the planned route and the determined location in a memory of the mobile transceiver in a tracking log.

7. The method of claim 6, further comprising:
storing the determined priority in the memory of the mobile transceiver in the tracking log.

8. The method of claim 1, wherein the information about deviations included in the alert includes one or more of an amount of each detected deviation from the planned route and an indication of whether the mobile transceiver is progressing towards its destination.

9. The method of claim 1, wherein the information about deviations included in the alert includes a priority ranking of the alert.

10. The method of claim 1, further comprising
calculating a speed of travel; and
calculating an estimated delay in an estimated time of arrival (ETA) at the destination based on the calculated speed and the amount of the determined deviation from the planned route;
storing the estimated delay in the ETA in memory;
wherein the alert includes the estimated delay in the ETA.

11. The method of claim 10, wherein the speed of travel is calculated using location data obtained from the satellite receiver.

12. The method of claim 10, wherein the speed of travel is calculated using location data stored in an asset tracking log.

13. The method of claim 1, further comprising:
calculating a speed of travel using location data obtained from the satellite receiver or an asset tracking log;
identifying one or more subsequent waypoints in a travel itinerary defining the planned route;
determining one or more estimated time of arrivals (ETAs) at the one or more subsequent waypoints based on the calculated speed; and
setting one or more alarms to be triggered at the one or more ETAs.

14. The method of claim 13, wherein the one or more alarms are time-based or date-based alarms.

15. The method of claim 1, wherein the travel itinerary specifies a Global Navigation Satellite System (GNSS) coordinate for each of the waypoints in the travel itinerary, wherein determining, based on the determined location, whether the mobile transceiver is progressing towards its destination comprises:
calculating a heading of the mobile transceiver using GNSS coordinates obtained using the satellite receiver over a second threshold duration;
calculating a planned heading using a plurality of GNSS coordinates specified in the travel itinerary closest to the determined location;
wherein it is determined that the mobile transceiver is progressing towards the destination when the calculated heading of the mobile transceiver is within a threshold deviation of the planned heading, and wherein it is determined that the mobile transceiver is not progressing towards the destination when the calculated heading of the mobile transceiver is not within the threshold deviation of the planned heading.

16. The method of claim 1, wherein the travel itinerary specifies a Global Navigation Satellite System (GNSS) coordinate for each of the waypoints in the travel itinerary, wherein determining, based on the determined location, whether the mobile transceiver is progressing towards its destination comprises:
calculating a heading of the mobile transceiver using an electronic compass over a second threshold duration;
calculating a planned heading using a plurality of GNSS coordinates specified in the travel itinerary closest to the determined location;
wherein it is determined that the mobile transceiver is progressing towards the destination when the calculated heading of the mobile transceiver is within a threshold deviation of the planned heading, and wherein it is determined that the mobile transceiver is not progressing towards the destination when the calculated heading of the mobile transceiver is not within the threshold deviation of the planned heading.

17. The method of claim 1, wherein the planned route is defined by a pre-programmed travel itinerary defining a planned route, the travel itinerary being stored in a memory of the mobile transceiver and defining a plurality of waypoints along the planned route, each of the waypoints defining a location, the waypoints including an origin endpoint, a destination endpoint.

18. The method of claim 17, wherein the pre-programmed travel itinerary specifies a Global Navigation Satellite System (GNSS) coordinate for each of a plurality of waypoints in the travel itinerary, wherein determining whether the determined location deviates from the planned route comprises:
comparing the GNSS coordinate of the determined location to the GNSS coordinates in the pre-programmed travel itinerary; and
determining whether the determined location is within the threshold distance of a waypoint of the pre-programmed travel itinerary.

19. A mobile transceiver, comprising:
a processor;
a satellite receiver coupled to the processor; and
a cellular transceiver coupled to the processor;
wherein the processor is configured to:
determine by the mobile transceiver a location of the mobile transceiver using the satellite receiver;
determine by the mobile transceiver whether the determined location deviates from a planned route;
in response to a determination that the determined location deviates from the planned route, determine a priority of the deviation from the planned route based on a distance of the determined location of the mobile transceiver from the planned route, wherein the determination that the determined location deviates from the planned route is when the mobile transceiver is not within a threshold distance of the planned route;

in response to a determination that deviation from the planned route is a low priority deviation, maintain the cellular transceiver of the mobile transceiver in a low power mode, wherein the low priority deviation is determined when the mobile transceiver is determined to be progressing towards its destination; and in response to a determination that deviation from the planned route is a high priority deviation, activate the cellular transceiver of the mobile transceiver from the low power mode, and send an alert from the mobile transceiver to an asset tracking service via the cellular transceiver, wherein the high priority deviation is determined when the mobile transceiver is determined to be not progressing towards its destination.

20. A non-transitory machine readable medium having tangibly stored thereon executable instructions for execution by a processor of a mobile transceiver, the mobile transceiver comprising a memory, a satellite receiver, and a cellular transceiver each coupled to the processor, wherein the executable instructions, when executed by the processor, cause the mobile transceiver to:

determine by the mobile transceiver a location of the mobile transceiver using a satellite receiver;

determine by the mobile transceiver whether the determined location deviates from a planned route;

in response to a determination that the determined location deviates from the planned route, determine a priority of the deviation from the planned route based on a distance of the determined location of the mobile transceiver from the planned route, wherein the determination that the determined location deviates from the planned route is when the mobile transceiver is not within a threshold distance of the planned route;

in response to a determination that deviation from the planned route is a low priority deviation, maintain a cellular transceiver of the mobile transceiver in a low power mode, wherein the low priority deviation is determined when the mobile transceiver is determined to be progressing towards its destination; and in response to a determination that deviation from the planned route is a high priority deviation, activate the cellular transceiver of the mobile transceiver from the low power mode, and send an alert from the mobile transceiver to an asset tracking service via the cellular transceiver, wherein the high priority deviation is determined when the mobile transceiver is determined to be not progressing towards its destination.

* * * * *